United States Patent [19]

Goldberg et al.

[11] Patent Number: 4,889,559
[45] Date of Patent: Dec. 26, 1989

[54] LATENT INK

[76] Inventors: Murrell A. Goldberg, 805 Berwyn Dr., Louisville, Ky. 40223; Jack Sammons, 4223 Hopewell Rd., Louisville, Ky. 40299

[21] Appl. No.: 616,954

[22] Filed: Jun. 4, 1984

[51] Int. Cl.$^4$ ............................................. C09D 11/00
[52] U.S. Cl. ........................................ 106/21; 106/26; 106/214
[58] Field of Search ...................... 106/21, 22, 26, 214

[56] References Cited

U.S. PATENT DOCUMENTS

| | | | |
|---|---|---|---|
| 3,617,325 | 11/1971 | Spokes et al. | 117/1.7 |
| 3,846,141 | 11/1974 | Ostergren et al. | 106/22 |
| 4,180,407 | 12/1979 | Gibson et al. | 106/26 |
| 4,256,493 | 3/1981 | Yokoyama et al. | 106/26 |
| 4,272,292 | 6/1981 | Mizuno et al. | 106/26 |
| 4,303,409 | 12/1981 | Ogawa et al. | 422/56 |

OTHER PUBLICATIONS

Derwent Abstract Accession No. 82-73543e/35, Japanese Patent No. 457119963-a.

Derwent Abtract Accession No. 82-80879E/38, Soviet Union Patent No. SU-883093-A.
Derwent Abstract Accession No. 84-199936/32, Soviet Union Patent No. SU1058982-A.
Derwent Abstract Accession No. 81-41487D/23, Soviet Union Patent No. SU-763500-A.
Derwent Abstract No. 81-01248D/02, Soviet Union Patent No. SU-732315-A.
Derwent Abstract Accession No. 75-55083W/33, Russian Patent No. SU-437718, Mar. 5, 1975.

*Primary Examiner*—Amelia Burgess Yarbrough
*Attorney, Agent, or Firm*—Jon C. Winger

[57] ABSTRACT

A latent ink which includes a liquid carrier, a latent image forming material as the coloring component, a thickening, film forming agent, and a liquid humectant. The thickening, film forming agent is used to adjust the viscosity of the ink as well as provides for the formation of a thin, clear film of uniformly dispersed latent image forming material when the ink is applied to a substrate. The humectant prevents the thickening, film forming agent from becoming brittle when applied to the substrate.

3 Claims, No Drawings

LATENT INK

BACKGROUND OF THE INVENTION

The present invention relates to inks having a color forming reactant which changes color by the application thereto of a coreactant. More particularly, the present invention is directed to latent inks which provide for the formation of uniformly dispersed color forming reactant with a thin, clear film when the ink is applied to a substrate.

Latent inks are known, per se. Examples of heretofore known latent inks and their uses are disclosed in the following issued U.S. patents.

U.S. Pat. No. 3,454,344 issued on July 8, 1969 to J. W. Ryan.

U.S. Pat. No. 3,473,807 issued on Oct. 21, 1969 to R. Leonard.

U.S. Pat. No. 3,600,827 issued on Aug. 24, 1971 to Denys Fesher.

U.S. Pat. No. 3,617,325 issued on Nov. 2, 1971 to Raymond E. Spokes.

U.S. Pat. No. 3,682,673 issued n Aug. 8, 1972 to W. J. Manske.

U.S. Pat. No. 3,826,499 issued on July 30, 1974 to L. G. Lenkoff.

U.S. Pat. No. 3,850,649 issued on Nov. 26, 1974 to D. D. Buerkley.

U.S. Pat. No. 3,920,863 issued on Nov. 18, 1975 to Robert Fraike.

U.S. Pat. No. 4,111,462 issued on Sept. 5, 1978 to Heinz E. Lange.

U.S. Pat. No. 4,139,965 issued on Feb. 20, 1979 to Beverly J. Curry.

U.S. Pat. No. 4,188,431 issued on Feb. 12, 1980 to P. E. Sokol.

U.S. Pat. No. 4,212,393 issued on July 15, 1980 to Leon G. Lenkoff.

All of the latent inks heretofore known to us have the drawback that when they are applied to a fabric substrate they are absorbed into the substrate material which can result in blurred or fuzzy images when the latent ink is developed. Further, when different color heretofore known inks are applied in close mutual proximity on a substrate, they tend to bleed together or into one another resulting in muddied colors when developed.

SUMMARY OF THE INVENTION

The present invention recognizes these drawbacks of the prior known latent inks, and provides a solution thereto which obviates them.

The present invention further provides a latent ink which can be applied to a substrate by conventional printing methods.

The present invention also provides a latent ink wherein different colors can be applied to a substrate in very close, even virtually abutting relationship and will not bleed together, thereby resulting in clear colors when the ink is developed.

More particularly, the present invention provides a latent ink comprising a liquid carrier medium, a latent image forming material as the coloring component of the ink, an agent providing for the formation of a thin, clear resin film of uniformly dispersed latent image forming material when the ink is applied to a substrate, and a liquid humectant for preventing the film forming agent from becoming brittle when the ink is applied to the substrate.

DETAILED DESCRIPTION OF THE PREFERRED EMBODIMENT

The first advantageous embodiment of a latent ink of the present invention for application to, for example, a fabric substrate such as paper, utilizes a PH sensitive indicator as the coloring component.

The latent ink comprises a liquid carrier medium, the PH sensitive indicator, a liquid humectant for preventing the ink from becoming brittle when the ink has dried on the substrate, and a thickening, film forming agent for adjusting the viscosity of the latent ink to a predetermined value and forming a film containing dispersed indicator.

The carrier medium can be virtually any liquid which is non-toxic, non-volatile, and which will not chemically react with the other ingredients of the ink. For example, an ideal liquid carrier is water because it is plentiful, relatively inexpensive and non-toxic.

The choice of a particular PH sensitive indicator will depend upon the color change desired. It is presently contemplated that the preferred color shift is from virtually colorless to a visible color. Examples of such PH sensitive indicators are: Picric Acid which has a color change from colorless to yellow at a visual transition interval of a PH of from 0.2-1.0; m-Nitrophenol which has a color change from colorless to yellow at a visual transition internal of a PH of from 6.6-8.0; Phenolphthalein which has a color change from colorless to red at a visual transition interval of a PH of from 8.0-10.0; and Thymolphthalein which has a color change from colorless to blue at a visual transition interval of a PH of from 8.6-10.0. However, it should be fully understood that, depending upon the objective or end use of the latent ink, any PH sensitive indicator can be used in the latent ink of the present invention.

The liquid humectant is provided in the latent ink to prevent the ink from becoming brittle. The humectant is preferably a miscible, non-volatile, stable organic chemical such as a monohydroxylated or polyhydroxylated compound which as been reacted with ethylene oxide or propylene oxide. Examples of suitable monohydroxylated and polyhydroxylated compounds which have been reacted with ethylene oxide include: 1-butoxyethanol; and 1-hydroxy ethoxy, 2-hydroxy propane; respectively. Examples of suitable monohydroxylated and polyhydroxylated compounds which have been reacted with propylene oxide include: 1-butoxy, 2-hydroxy propane; and 2-hydroxy propoxide, 2-hydroxy propane; respectively.

The latent PH sensitive indicator ink also includes a thickening, film forming agent to increase the viscosity of the ink to a predetermined value and to function as a clear film forming agent when the ink is applied to the substrate. The thickening, film forming agent is preferably miscible, non-volatile and stable. The thickening, film forming agent further provides for the formation of a thin, clear resin film of uniformly dispersed mixture of the PH sensitive indicator when the ink is applied to a substrate. The thickening agent forms a gel, dispersion or solution with carrier medium, humectant, and PH indicator. Preferably, the thickening, film forming agent consists of a cellulose derivative, a vinyl acetate latex emulsion, or an acrylic latex emulsion, or any combination thereof. More particularly, the cellulose derivative is selected from the group consisting of carboxylated methyl cellulose, ethylene oxide derivatives of cellulose, and propylene oxide derivatives of cellulose. More particularly, the vinyl acetate latex emulsion is selected from the group consisting of vinyl acetate homopolymers, and vinyl acetate copolymers. More particularly, the acrylic latex emulsion is selected from the group consisting of acrylic homopolymers, and acrylic copolymers.

The predetermined viscosity should be on the order of between about 1000 cps to about 50,000 cps.

Various PH sensitive latent inks according to the present invention are prepared as in the following examples.

EXAMPLE I

A PH sensitive indicator latent ink is prepared by mixing a carrier medium, for example, water; a thickening agent, for example, hydroxyethyl cellulose (HEC); and a humectant, for example, di-propylene glycol (DPG). The weight percent of the various compounds are about 92% water, 2%–4% hydroxyethyl cellulose, and 4%–6% di-propylene glycol. The weight percent of indicator in the ink is a function of the tri-stimulous values such as intensity, hue, brightness, shade, and the like of the colors of the image to be replicated using the ink. From about 1% to about 3%, by weight, of a micropulverized, selected PH sensitive indicator salt or free acid is added to this mixture to form a latent ink having a viscosity of about 1000 cps.

Three different latent indicator inks were prepared, one wherein the selected indicator is Bromothymol Blue having a yellow to blue color change at a PH visual transition internal of from 6.0–7.6, one wherein the selected indicator is m-Nitrophenol having a colorless to yellow color change at a PH visual transition interval of from 6.6–8.6, and one wherein the selected indicator is Phenol Red having a yellow to red color change at a PH visual transition interval of from 6.7–8.0.

EXAMPLE II

A latent PH sensitive indicator ink is prepared as in Example I using different weight percentages of the ingredients. In this instance about 89% water, about 6% hydroxyethyl cellulose (HEC), and about 5% di-propylene glycol (DPG) are mixed. From about 1% to about 3%, by weight, of a micropulverized, selected PH sensitive indicator salt or free acid is added to this mixture to form a latent ink having a viscosity of about 25,000 cps.

As in Example I, three different latent indicator inks are prepared, one having Bromothymol Blue as the indicator, the second having m-Nitrophenol as the indicator, and the third having Phenol Red as the indicator.

EXAMPLE III

A latent PH sensitive indicator ink is prepared as in Example I using different weight percentages of the ingredients. For instance, about 93% water, about 2% hydroxyethyl cellulose (HEC), and about 5% di-propylene glycol (DPG) are mixed. From about 1% to about 3%, by weight, of a micropulverized, selected PH sensitive indicator salt or free acid is added to this mixture to form a latent ink having a viscosity of about 50,000 cps.

As in Example I, different latent indicator inks are prepared, one having Bromothymol Blue as the indicator, the second having m-Nitrophenol as the indicator, and the third having Phenol Red as the indicator.

Each of the above-discussed PH sensitive indicator latent inks were individually applied to a paper substrate in a dot matrix in a predetermined array to produce a picture or reproduction of an item by virtually any conventional printing process, for example, screen, flexographic, or lithographic printing process. In doing so, the dots are placed in various degrees of proximity to one another, and in varied densities (number if ink dots per unit area) as dictated by the color of the image to be formed on the substrate, as determined by the tri-stimulous values of the indicator inks.

Using, for example, conventional screen printing techniques, a colored image, for example a photograph, to be reproduced using the above-discussed PH sensitive indicator latent inks was separated into its three color components (red, yellow, and blue). Printing screens were prepared for each color separation, thus, dictating the position, array and concentration of the ink dots for each color indicator ink on the paper substrate to be printed.

Each of the three screens is sequentially attached to an appropriate frame and the appropriate colored indicator ink, which when colored shifted, corresponds to one of the separated colors, is washed onto the screen. The ink passes through the screen and onto the paper substrate. After each indicator ink has been separately applied to the paper substrate, the color image has been duplicated on the paper substrate. The reproduced, yet undeveloped image is virtually invisible but for a slight yellow cast of the Phenol Red indicator.

The image thus replicated on the paper substrate is developed by applying a solution containing, for example, a buffered sodium or potassium carbonate-bicarbonate salt, which has a sufficient PH value to cause the dots of each latent indicator ink to change color to its respective indicator color, thus immediately resulting in a colored image similar to the original.

Virtually any of the known PH sensitive indicators can be used in the latent ink of the present invention with the understanding, of course, that they will not all provide an invisible undeveloped latent image on the substrate. One practical consideration in choosing the PH sensitive indicator for each of the colors to be replicated or reproduced is that their respective PH visual transition intervals be in a generally narrow range to simplify the ingredients of the developing solution. That is, if each of the PH sensitive indicators used in the latent inks to produce different colors have a visual transition interval range as close to or overlapping the visual transition interval range of the other PH sensitive indicators, a developing reactant having a relatively narrow PH range can be used.

Another advantageous embodiment of a latent ink of the present invention for application to, for example, a fabric substrate such as paper, utilizes a Redox indicator as the coloring component.

The latent ink comprises a liquid carrier medium, the Redox indicator, a liquid humectant for preventing the ink from becoming brittle when the ink has dried on the substrate, and a thickening, film forming agent for adjusting the viscosity of the latent ink to a predetermined value.

The carrier medium can be virtually any liquid which is non-toxic, non-volatile, and which will not chemically react with the other ingredients of the ink. For example, an ideal liquid carrier is water.

The choice of a particular Redox indicator will depend upon the color change desired. It is presently contemplated that the preferred color shift is from virtually colorless to a visible color. Examples of such Redox indicators are: ortho-Tolidine which is colorless in its reduced form and has a color change to yellow in its oxidized form at a PH potential of about 1.8 volts; Dichloroindophenol which is colorless in its reduced form and has a color change to red at a PH potential of about 0.67 volts; and Methylene Blue which is colorless in its reduced form and has a color change to blue at a PH potential of about 0.53 volts. However, it should be understood that these are examples only and are not limiting to the various Redox indicators which can be used. The particular Redox indicator used will depend upon the end use or objective of the latent indicator ink.

The liquid humectant is provided in the latent ink to prevent the ink from becoming brittle. The humectant is preferably a miscible, non-volatile, stable organic chemical such as a monohydroxylated or polyhydroxylated compound which as been reacted with ethylene oxide or propylene oxide. Examples of suitable monohydroxylated and polyhydroxylated compounds which have been reacted with ethylene oxide include: 1-butoxyethanol: and 1-hydroxy ethoxy, 2-hydroxy propane: respectively. Examples of suitable monohydroxylated and polyhydroxylated compounds which have been reacted with propylene oxide include: 1-butoxy, 2-hydroxy propane; and 2-hydroxy propoxide, 2-hydroxy propane; respectively.

The latent Redox indicator ink also includes a thickening, film forming agent to increase the viscosity of the ink to a predetermined value. The thickening, film forming agent is preferably miscible, non-volatile and stable. The thickening, film forming agent further provides for the formation of a thin, clear resin film of uniformly dispersed mixture of the Redox indicator when the ink is applied to a substrate. The thickening agent forms a gel, dispersion or solution with carrier medium, humectant, and Redox indicator. Preferably, the thickening, film forming agent consists of a cellulose derivative, a vinyl acetate latex emulsion, or an acrylic latex emulsion, or any combination thereof. More particularly, the cellulose derivative is selected from the group consisting of carboxylated methyl cellulose, ethylene oxide derivatives of cellulose, and propylene oxide derivatives of cellulose. More particularly, the vinyl acetate latex emulsion is selected from the group consisting of vinyl acetate homopolymers, and vinyl acetate copolymers. More particularly, the acrylic latex emulsion is selected from the group consisting of acrylic homopolymers, and acrylic copolymers.

The predetermined viscosity should be on the order of between about 1000 cps to about 50,000 cps.

Various Redox indicator latent inks according to the present invention are prepared as in the following examples.

EXAMPLE IV

A Redox indicator latent ink is prepared by mixing a carrier medium, for example, water; a thickening agent, for example, hydroxyethyl cellulose (HEC): and a humectant, for example, di-propylene glycol (DPG). The weight percent of the various compounds are about 92% water, 2%-4% hydroxyethyl cellulose, and 4%-6% di-propylene glycol. The weight percent of indicator in the ink is a function of the tri-stimulous values of the colors of the image to be replicated using the ink. From about 1% to about 3%, by weight, of a micropulverized, selected Redox indicator are added to this mixture to form a latent ink having a viscosity of about 1000 cps.

Three different latent indicator inks were prepared, one wherein the selected Redox indicator was Methylene Blue having a clear to blue color change at a PH potential of 0.53 volts, another wherein the selected Redox indicator was ortho-Tolidine having a colorless to yellow color change at a PH potential of 1.8 volts, and a third wherein the selected indicator was Dichloroindophenol having a clear to red color change at a PH potential of 0.67 volts.

EXAMPLE V

A latent Redox indicator ink is prepared as in Example IV using different weight percentages of the ingredients. In this instance about 89% water, about 6% hydroxyethyl cellulose, and about 5% di-propylene glycol are mixed. From about 1% to about 3%, by weight, of a selected Redox indicator is added to this mixture to form a latent ink having a viscosity of about 25,000 cps.

As in Example IV, three different latent Redox indicator inks are prepared, one having Methylene Blue as the Redox indicator, the second having ortho-Tolidine as the Redox indicator, and the third having Dichloroindophenol as the Redox indicator.

EXAMPLE VI

A latent Redox indicator ink is prepared as in Example IV using different weight percentages of the ingredients. For instance, about 93% water, about 2% hydroxyethyl cellulose, and about 5% di-propylene glycol are mixed. From about 1% to about 3%, by weight, of a selected Redox indicator is added to this mixture to form a latent ink having a viscosity of about 50,000 cps.

As in Example IV, different latent inks are prepared, one having Methylene Blue as the Redox indicator, the second having ortho-Tolidine as the Redox indicator, and the third having Dichloroindophenol as the Redox indicator.

Each of the above-discussed PH sensitive indicator latent inks were individually applied to a paper substrate in a dot matrix in a array to produce a picture or reproduction of an item by virtually any conventional printing process, for example, screen, flexographic, or lithographic printing process. In doing so, the dots are placed in various degrees of proximity to one another, and in varied densities (number if ink dots per unit area) as dictated by the color of the image to be formed on the substrate, as determined by the tri-stimulous values of the indicator inks.

Using, for example, conventional screen printing techniques, a colored image to be reproduced, from for example a photograph, using the above-discussed Redox indicator latent inks was separated into its three color components (red, yellow, and blue). Printing screens were prepared for each color separation, thus, dictating the position, array and concentration of the ink dots for each color indicator ink on the paper substrate to be printed.

Each of the three screens is sequentially attached to an appropriate frame and the appropriate colored indicator ink, which when colored shifted, corresponds to one of the separated colors, is washed onto the screen. The ink passes through the screen and onto the paper substrate. After each Redox indicator ink has been separately applied to the paper substrate, the color image has been duplicated on the paper substrate.

The image thus replicated on the paper substrate is developed by applying a solution containing an appropriate oxidizer which covers the highest oxidation potential of the Redox indicator used in the various inks. For example, the oxidizer can be bleach, hydrogen peroxide, catalyzed organic peroxide, or salts in an aqueous solution. Preferably, the oxidizer is non-toxic, nonvolatile and stable. Thus, upon application of the oxidizing solution to the undeveloped image, the dots of each latent indicator ink change color, thus, resulting in a colored image similar to the original.

Yet another advantageous embodiment of a latent ink of the present invention for application to, for example, a fabric substrate such as paper, utilizes a complexiometric ingredient as the coloring component. Complexiometric as herein used defines an organic material capable of forming a chromophoric group when reacted with a metal. It is believed that a chemical reaction takes place which results in an electron shift within the chemical compound which yields a color that is in the visible range.

The latent ink comprises a liquid carrier medium, the complexiometric coloring component, a liquid humectant for preventing the ink from becoming brittle when the ink has dried on the substrate, and a thickening color forming agent for adjusting the viscosity of the latent ink to a predetermined value and forming a film containing dispersed coloring component.

The carrier medium can be virtually any liquid which is non-toxic, non-volatile, and which will not chemically react with the other ingredients of the ink. For example, an ideal liquid carrier is water.

The choice of a particular complexiometric color producing component will depend upon the color change desired. It is presently contemplated that the preferred color shift is from virtually colorless to a visible color. Examples of such complexiometric organic material are, for example, O-phenanthroline which has a color change from colorless to yellow when reacted with iron; Dimethylglyoxime which has a color change from colorless to red when reacted with iron; and Tiron which has a color change from colorless to blue when reacted with iron. Other examples include, for example, Acetoxyguinaldine which has a color change from colorless to blue when reacted with aluminum, and Aurintricarboxylic Acid which has a color change from colorless to red when reacted with aluminum. The list is virtually limitless.

The liquid humectant is provided in the latent ink to prevent the ink from becoming brittle. The humectant is preferably a miscible, non-volatile, stable organic chemical such as a monohydroxylated or polyhydroxylated compound which has been reacted with ethylene oxide or propylene oxide. Examples of suitable monohydroxylated and polyhydroxylated compounds which have been reacted with ethylene oxide include: 1-butoxyethanol; and 1-hydroxyethoxy, 2-hydroxy propane; respectively. Examples of suitable monohydroxylated and polyhydroxylated compounds which have been reacted with propylene oxide include 1-butoxy, 2-hydroxy propane; and 2-hydroxy propoxide, 2-hydroxy propane; respectively.

The latent complexiometric ink also includes a thickening, film forming agent to increase the viscosity of the ink to a predetermined value, and to function as a clear film forming agent when the ink is applied to the substrate. The thickening, film forming agent is preferably miscible, non-volatile and stable. The thickening, film forming agent further provides for the formation of a thin, clear resin film of uniformly dispersed complexiometric color component when the ink is applied to a substrate. The thickening agent forms a gel, dispersion or solution with the carrier medium, humectant, and complexiometric component. Preferably, the thickening, film forming agent consists of a cellulose derivative, a vinyl acetate latex emulsion, or an acrylic latex emulsion, or any combination thereof. More particularly, the cellulose derivative is selected from the group consisting of carboxylated methyl cellulose, ethylene oxide derivatives of cellulose, and propylene oxide derivatives of cellulose. More particularly, the vinyl acetate latex emulsion is selected from the group consisting of vinyl acetate homopolymers, and vinyl acetate copolymers. More particularly, the acrylic latex emulsion is selected from the group consisting of acrylic homopolymers, and acrylic copolymers.

The predetermined viscosity should be on the order of between about 1000 cps to about 50,000 cps.

Various complexiometric color component containing latent inks of the present invention are prepared as in the following examples.

EXAMPLE VII

A latent ink is prepared by mixing a carrier medium, for example, water; a thickening agent, for example, hydroxyethyl cellulose; and a humectant, for example, di-propylene glycol. The weight percent of the various components are about 92% water, 2%–4% hydroxethyl cellulose, and 4%–6% di-propylene glycol. The weight percent of the complexiometric color component is a function of the tri-stimulous value of the color of the image to be replicated using the ink. For example, from about 1% to 3%, by weight, of a complexiometric component is added to this mixture to form a latent ink having a viscosity of about 1000 cps.

Three different latent complexiometric inks were prepared, one wherein the selected organic material is O-phenanthroline having a color change from colorless to yellow when reacted with iron, another wherein the selected organic material is Dimethylglyoxime having a color change from colorless to red when reacted with iron, and a third wherein the selected organic material is Tiron having a color change from colorless to blue when reacted with iron.

EXAMPLE VIII

A latent ink is prepared as in Example VII using different weight percentages of the ingredients. In this instance about 89% water, about 6% hydroxyethyl cellulose, and about 5% di-propylene glycol are mixed. From about 1% to 3%, by weight, of selected organic coloring material is added to this mixture to form a latent ink having a viscosity of about 25,000 cps.

As in Example VII, three different latent inks are prepared, one having O-phenanthroline, the second having Dimethylglyoxime, and the third having Tiron as the organic material.

EXAMPLE IX

A latent ink is prepared as in Example VII using different weight percentages of the ingredients. For instance, about 93% water, about 2% hydroxyethyl cellulose, and about 5% di-propylene glycol are mixed. From about 1% to 3%, by weight, of the selected complexiometric organic material is added to this mixture to form a latent ink having a viscosity of about 50,000 cps.

As in Example VII, three different latent inks are prepared, one having O-phenanthroline, the second having Dimethylglyoxime, and the third having Tiron as the organic material.

Each of the above-discussed complexiometric latent inks were individually applied to a paper substrate in a dot matrix in a predetermined array to produce a picture of an item by virtually any conventional printing process, for example, screen, flexographic, or lithographic printing process as discussed above in regard to the PH sensitive and Redox latent inks.

The image thus replicated on the paper substrate is developed by applying a solution containing a specific metal salt required to react with the selected organic coloring material of the latent inks. For example, to develop the latent inks of Examples VII to IX, the metal salt solution contains a buffered ferrous-ferric ion which forms a chromophoric group with the selected examples of organic materials.

Virtually any organic material capable of forming a chromophoric group when reacted with a metal can be used with the understanding, of course, that not all of them will provide an invisible undeveloped latent image, nor produce a yellow, red or blue color when developed. One practical consideration in choosing the organic material for each color to be replicated is that they all react with the same metal, thus, simplifying the ingredients of the developing solution.

The present invention provides a latent ink which, when applied to a substrate in the undeveloped state, will not readily be absorbed by the material of the substrate due to the thickening, film forming ingredient. Further, thickening, film forming component allows the dots of ink forming the image to be placed in much closer proximity to each other without bleeding into each other than heretofore known inks, thus, resulting in replicated images having colors, hues and brightness much more faithfully duplicating the original image being replicated than previously possible. In addition, the thickening, film forming agent provides for the tight control of the viscosity of the latent inks allowing control of the flow of the ink during the printing process so that the positioning of the dots of ink on the substrate can be accurately placed.

These and other advantageous embodiments of the present invention will become obvious in use.

The foregoing detailed description is given primarily for clearness of understanding and no unnecessary limitations should be understood therefrom for modifications thereto will become obvious to those skilled in the art upon reading this disclosure and may be made without departing from the spirit of the invention and scope of the appended claims.

What is claimed is:

1. A latent ink comprising,
   an aqueous solution carrier medium;
   a latent image forming material having a Redox indicator as the coloring component of the ink;
   a thickening and film forming agent selected from the group consisting of ethylene oxide derivatives of cellulose, and propylene oxide derivatives of cellulose or any combination thereof, for the formation of a thin, clear resin film of uniformly dispersed latent image forming material when the ink is applied to a substrate; and,
   a liquid humectant comprising a hydroxylated compound which has been reacted with ethylene oxide or propylene oxide for preventing the thickening and film forming agent from becoming brittle when the ink is dried on the substrate.

2. The latent ink of claim 1, wherein the Redox indicator is one which has a color shift to generally a primary color.

3. A set of latent inks, each ink comprises:
   an aqueous solution carrier medium;
   a Redox indicator as the coloring component having a color a different color than the Redox indicator of each of the other of the set;
   a thickening, film forming agent selected from the group consisting of ethylene oxide derivatives of cellulose, and propylene oxide derivatives of cellulose, or any combination thereof, providing for the formation of a thin, clear resin film of uniformly dispersed Redox indicator when the ink is applied to a substrate;
   a liquid humectant comprising a hydroxylated compound which has been reacted with ethylene oxide or propylene oxide for preventing the thickening and film forming agent from becoming brittle when the ink is dried on the substrate;
   wherein the Redox indicators of all of the inks of the set have a color change within a common generally narrow oxidation potential range.

* * * * *